US012759242B2

(12) United States Patent
Lin et al.

(10) Patent No.: US 12,759,242 B2
(45) Date of Patent: Oct. 13, 2026

(54) LIGHT-CURING 3D PRINTER

(71) Applicants: PHROZEN TECH CO., LTD., Hsinchu City (TW); DONGGUAN CITY PHROZEN TECH CO., LTD., Dongguan City (CN)

(72) Inventors: Wei-Chun Lin, Taichung City (TW); Rui Sheng Huang, Gaozhou City (CN); Shang Zheng, Handan City (CN)

(73) Assignees: PHROZEN TECH CO., LTD., Hsinchu City (TW); DONGGUAN CITY PHROZEN TECH CO., LTD., Dongguan City (CN)

( * ) Notice: Subject to any disclaimer, the term of this patent is extended or adjusted under 35 U.S.C. 154(b) by 267 days.

(21) Appl. No.: 18/642,544

(22) Filed: Apr. 22, 2024

(65) Prior Publication Data

US 2024/0391176 A1 Nov. 28, 2024

(30) Foreign Application Priority Data

May 23, 2023 (CN) ......................... 202310590361.5
Jul. 10, 2023 (CN) ......................... 202310842630.2
Aug. 16, 2023 (CN) ......................... 202322210502.4

(51) Int. Cl.
*B29C 64/393* (2017.01)
*B29C 64/129* (2017.01)
*B29C 64/321* (2017.01)
*B33Y 30/00* (2015.01)

(52) U.S. Cl.
CPC .......... *B29C 64/393* (2017.08); *B29C 64/129* (2017.08); *B29C 64/321* (2017.08); *B33Y 30/00* (2014.12)

(58) Field of Classification Search
CPC .... B29C 64/393; B29C 64/321; B29C 64/129
See application file for complete search history.

(56) References Cited

U.S. PATENT DOCUMENTS 4,225,802 A * 9/1980 Suzuki .................. G01L 23/222
73/35.11
4,456,042 A * 6/1984 Clark ..................... B23Q 1/267
248/656
2019/0381732 A1* 12/2019 Chen ..................... B29C 64/205

FOREIGN PATENT DOCUMENTS

CN 111168995 A * 5/2020 ............. B29C 4/129
CN 216658929 U * 6/2022

* cited by examiner

*Primary Examiner* — Galen H Hauth
*Assistant Examiner* — John Robitaille
(74) *Attorney, Agent, or Firm* — Maschoff Brennan

(57) ABSTRACT

A light-curing 3D printer includes a base, a display panel, a tank, a printing main body and a vibration detector. The display panel is disposed on the base. The tank is disposed on the base and corresponds to the display panel, and the tank is configured to store a printing material. The printing main body corresponds to the tank and the display panel and configured to perform 3D printing with the printing material in the tank. The vibration detector is disposed in the base and includes a piezoelectric ceramic sheet and a vibration transmission plate. The piezoelectric ceramic sheet is disposed on the vibration transmission plate, and the vibration transmission plate is in contact with the display panel.

17 Claims, 12 Drawing Sheets

LIGHT-CURING 3D PRINTER

CROSS-REFERENCE TO RELATED APPLICATIONS

This non-provisional application claims priority under 35 U.S.C. § 119(a) on Patent Application No(s). 202310590361.5 filed in China on May 23, 2023, Patent Application No(s). 202310842630.2 filed in China on Jul. 10, 2023, Patent Application No(s). 202322210502.4 filed in China on Aug. 16, 2023, the entire contents of which are hereby incorporated by reference.

TECHNICAL FIELD

The disclosure relates to a light-curing 3D printer.

BACKGROUND

Light curing is one of 3D printing technologies, which has the advantages of fast printing speed and high precision. Therefore, light curing is widely used in various fields, such as mechanical materials, biomedicine, jewelry, and microfluidics.

Light-curing 3D printing technology utilizes the principle of free radical photopolymerization to cross-link and polymerize liquid resin and transform it into a solid state through ultraviolet light irradiation, ultimately forming a three-dimensional body. According to different light source modules, it can be divided into two categories, such as point printing and surface printing, where the surface printing uses projection equipment such as DLP or LCD to project a slice pattern of a product onto liquid resin to complete the printing of an entire layer at one time, and then stack it layer by layer to finally obtain the entire three-dimensional body.

At present, in a light-curing 3D printer, a conventional pressure sensor is generally used to detect whether a printing platform contacts a display panel during the printing process, thereby determining whether printing is proceeding normally. However, the pressure sensor is too sensitive and thus easy to be interfered by outside factors, resulting in the possibility of false detection. Therefore, how to solve this issue is one of the crucial topics in this field.

SUMMARY

The disclosure provides a light-curing 3D printer which improves accuracy of the detection for determining whether the printing is proceeding normally.

One embodiment of the disclosure provides a light-curing 3D printer. The light-curing 3D printer includes a base, a display panel, a tank, a printing main body, and a vibration detector. The display panel is disposed on the base. The tank is disposed on the base and corresponds to the display panel, and the tank is configured to store a printing material. The printing main body corresponds to the tank and the display panel and configured to perform 3D printing with the printing material in the tank. The vibration detector is disposed in the base and includes a piezoelectric ceramic sheet and a vibration transmission plate. The piezoelectric ceramic sheet is disposed on the vibration transmission plate, and the vibration transmission plate is in contact with the display panel.

According to the light-curing 3D printer as disclosed in the above embodiment, when the piezoelectric ceramic sheet and the vibration detector are provided in the light-curing 3D printer, the vibration transmission plate can transmit the vibrations to the piezoelectric ceramic sheet during the printing process, such that whether the print process is performed normally can be determined according to the vibration detection result of the piezoelectric ceramic sheet, which is not easily interfered by outside factors, improves the reliability and the accuracy, has a simple configuration, reduces the cost, and is applicable.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
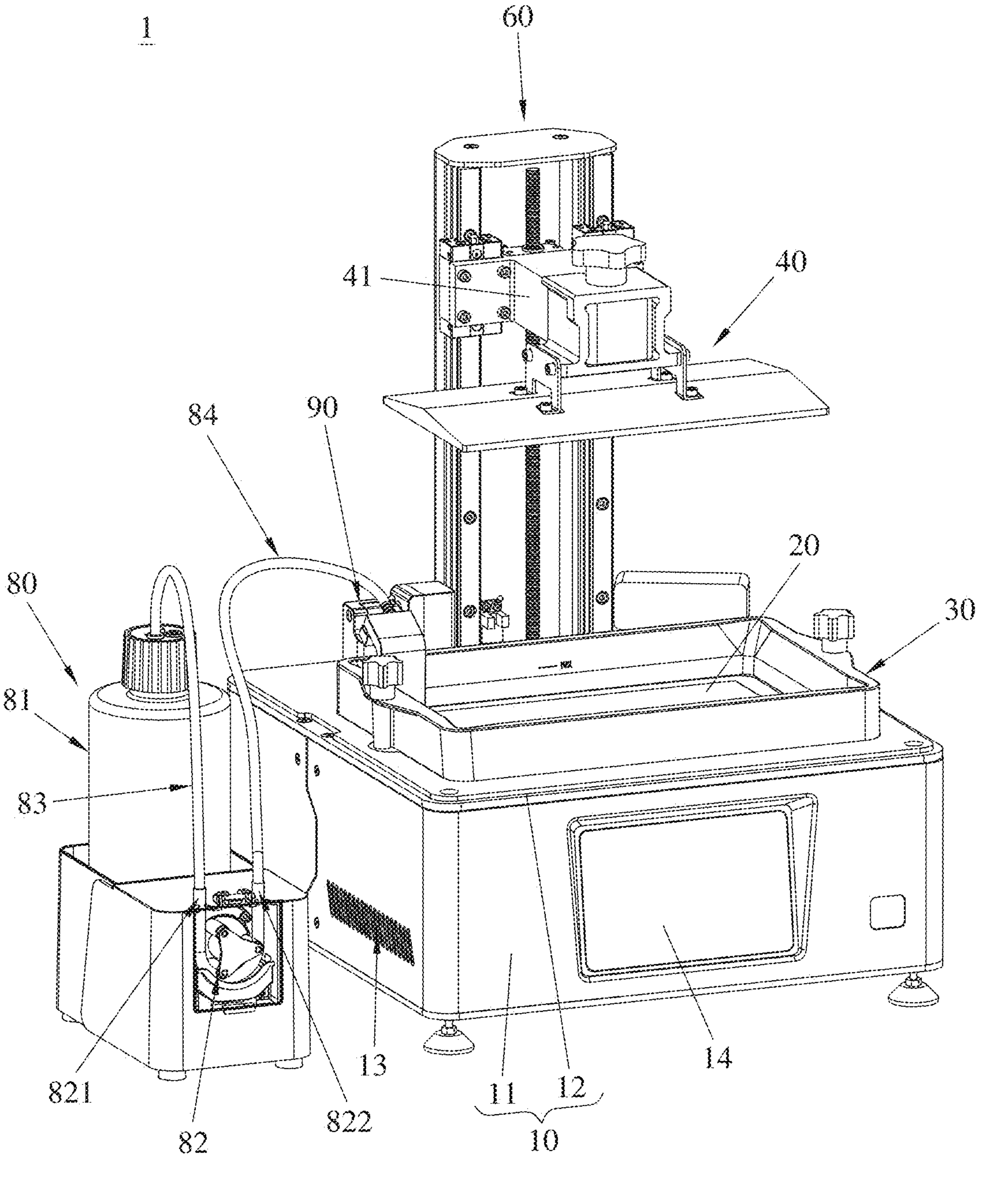
FIG. 1 is a perspective view of a light-curing 3D printer according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, FIG. 1 is a perspective view of a light-curing 3D printer according to one embodiment of the disclosure.

Figure 5:
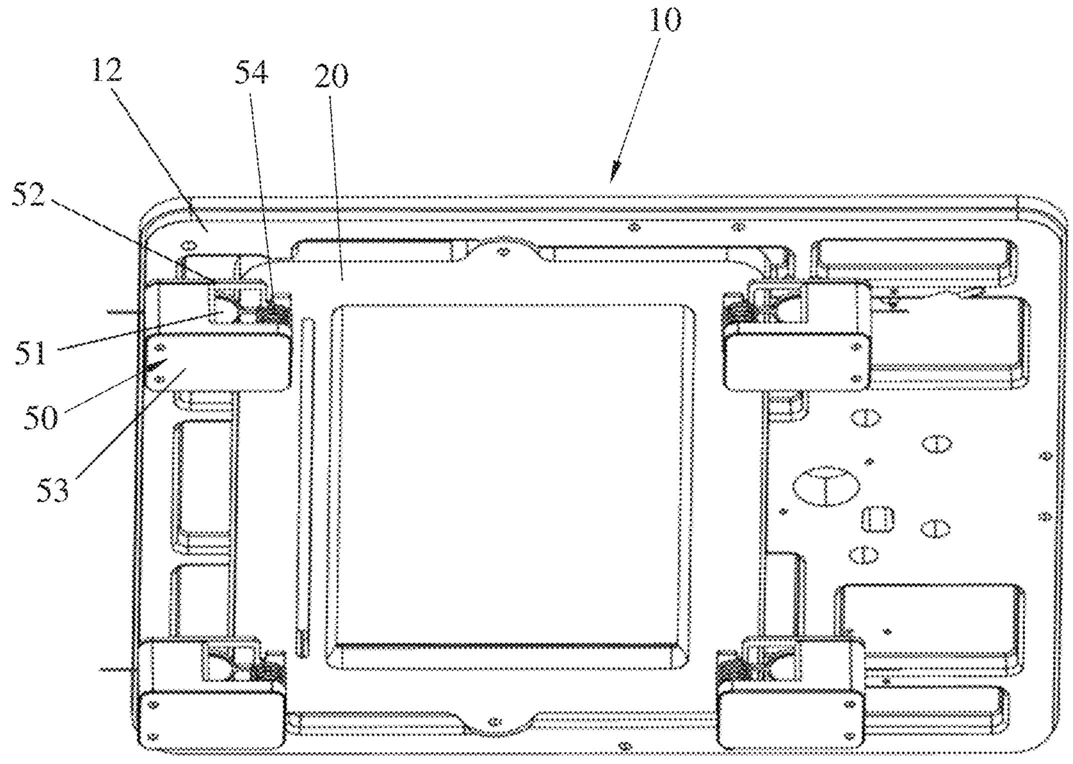
FIG. 5 is a perspective view of a covering portion of a base and a vibration detector in FIG. 1.

In this embodiment, the light-curing 3D printer 1 includes a base 10, a display panel 20, a tank 30, a printing main body 40 and a vibration detector 50 (shown in FIG. 5). In addition, the light-curing 3D printer 1 may further include a guiding mechanism 60 and an adjustment assembly 70.

The base 10 includes a bottom portion 11 and a cover portion 12 assembled with each other. The bottom portion 11 of the base 10 is provided with vent holes 13 and a control panel 14. The vent holes 13 allow airflow to enter into and leave the bottom portion 11 so as to take away heat generated by components (not shown) in the bottom portion 11. The control panel 14 may be provided with buttons for controlling the operation of the light-curing 3D printer 1.

The display panel 20 is embedded in the cover portion 12 of the base 10. The tank 30 is disposed on the cover portion 12 of the base 10 and corresponds to the display panel 20. The tank 30 is configured to store a printing material. The printing material is a fluid, and the printing material is, for example but not limited to, a photosensitive resin.

The printing main body 40 is movably disposed on the base 10 via the guiding mechanism 60, and can be elevated or lowered down relative to the base 10. The printing main body 40 corresponds to the tank 30 and the display panel 20, and is configured to perform 3D printing with the printing material in the tank 30.

Figure 2:
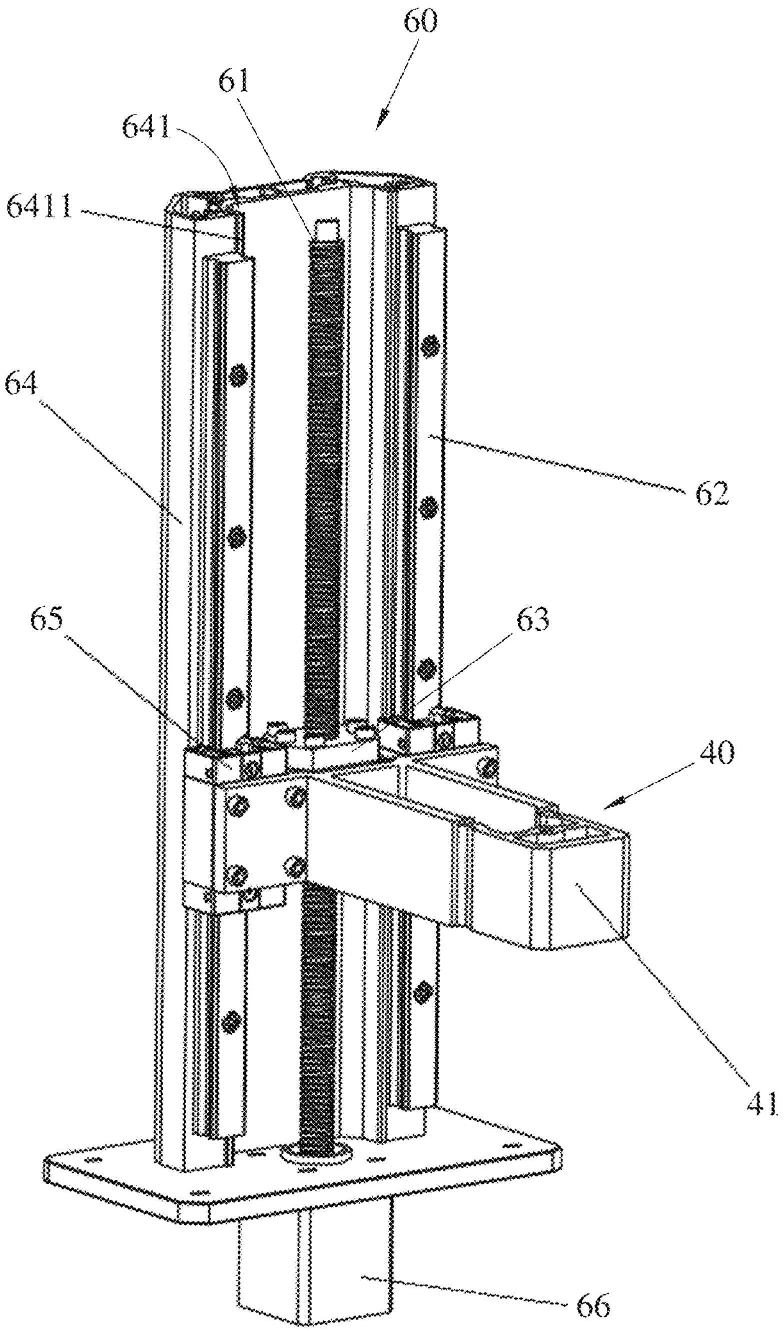
FIGS. 2 to 4 are perspective views showing different portions of a guiding mechanism of the light-curing 3D printer in FIG. 1.
Figure 3:
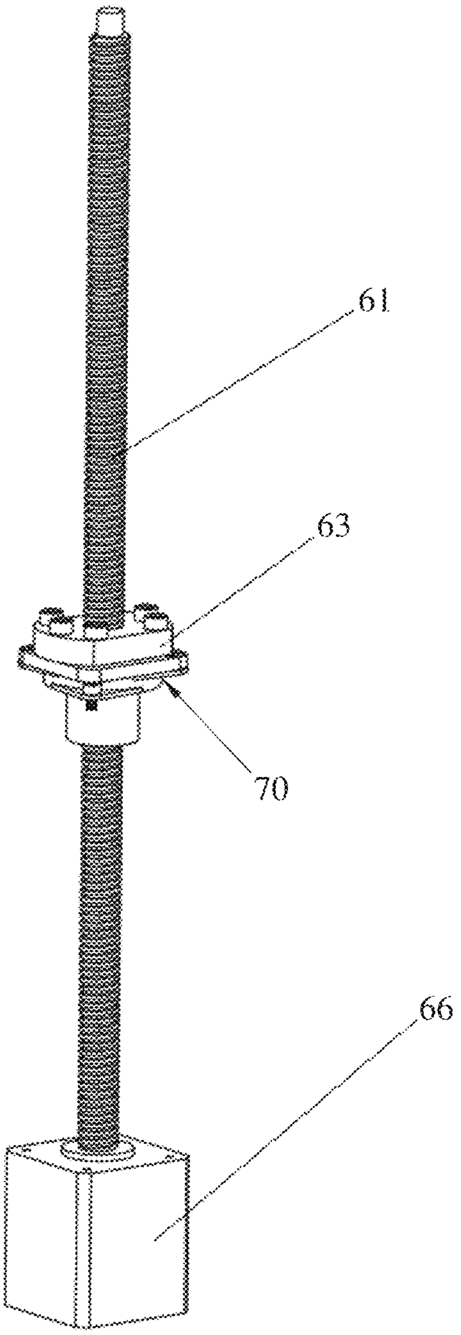
Figure 4:
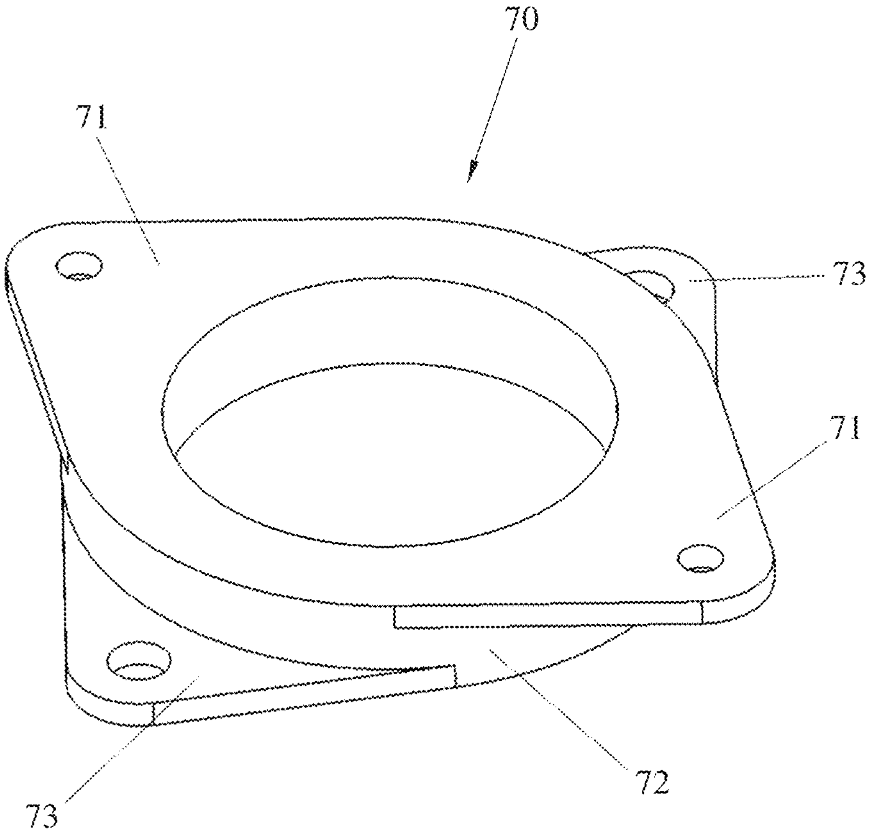

Then, referring to FIGS. 2 to 4, FIGS. 2 to 4 are perspective views showing different portions of a guiding mechanism of the light-curing 3D printer in FIG. 1.

Specifically, the guiding mechanism 60 includes a screw rod 61 and a guide rail 62. The screw rod 61 is connected to a ball nut 63 via screw threads, and the ball nut 63 and the guide rail 62 are connected to an arm 41 of the printing main body 40. When the screw rod 61 is driven to rotate, the ball nut 63 can move the arm 41 along the guide rail 62.

The adjustment assembly 70 is flexibly connected to the arm 41 and the ball nut 63 for eliminating a lateral force produced when the screw rod 61 and the guide rail 62 are non-parallel to each other. Specifically, the adjustment assembly 70 includes a first metal sheet 71, a flexible component 72 and a second metal sheet 73. The first metal sheet 71 is connected to the screw rod 61 via screw threads, and the second metal sheet 73 is connected to the arm 41 via screw threads. In detail, the flexible component 72 is made of rubber material, and the first metal sheet 71, the flexible component 72 and the second metal sheet 73 are shaped to form the adjustment assembly 70.

Note that the first metal sheet 71 and the second metal sheet 73 are disposed at an outer periphery of the flexible component 72, the first metal sheet 71 is connected to the screw rod 61, the second metal sheet 73 is connected to the arm 41, and the flexible component 72 is partially provided between the first metal sheet 71 and the second metal sheet 73. When the screw rod 61 and the guide rail 62 are non-parallel to each other, a lateral force may be produced between the screw rod 61 and the guide rail 62, and the flexible component 72 may be deformed by the lateral force so as to keep the ball nut 63 being moved on the screw rod 61. As a result, the arm 41 of the printing main body 40 can be smoothly and stably moved along the guide rail 62. In a conventional case that the screw rod 61 and the guide rail 62 are rigidly connected to each other, once the screw rod 61 and the guide rail 62 are non-parallel to each other, the upward and downward movement of the arm 41 may be unsmooth, which may cause a printed model has a laminar texture, or cause the arm 41 to be stuck, thereby failing 3D printing process. However, the aforementioned issue is solved in the disclosure.

Specifically, the guiding mechanism 60 further includes a stand 64. The stand 64 is provided with a step portion 641. A first side surface 6411 of the step portion 641 is disposed vertically. The guide rail 62 is in contact with the first side surface 6411 and is removably connected to the stand 64. The stand 64 and the guide rail 62 are provided with through holes. During the installation of the guide rail 62 on the stand 64, the through holes of the stand 64 and the through holes of the guide rail 62 are aligned with each other, the guide rail 62 is in contact with the step portion 641, and then screws are disposed through the through holes of the stand 64 and the through holes of the guide rail 62, thereby fastening the guide rail 62 on the stand 64. The guide rail 62 is removably connected to the stand 64, which facilitates the maintenance in the future. Note that the guide rail 62 may be connected to the stand 64 via another manner, and the disclosure is not limited thereto.

Specifically, the guiding mechanism 60 further includes a slidable component 65. The slidable component 65 is disposed on the guide rail 62 and is connected to the arm 41 of the printing main body 40. Specifically, the guiding mechanism 60 further includes a driving component 66. The driving component 66 is connected to the screw rod 61 for driving the screw rod 61 to rotate. The driving component 66 is, for example, a motor. The motor can be operated clockwise and counter-clockwise for moving the ball nut 63 upwards or downwards.

Figure 6:
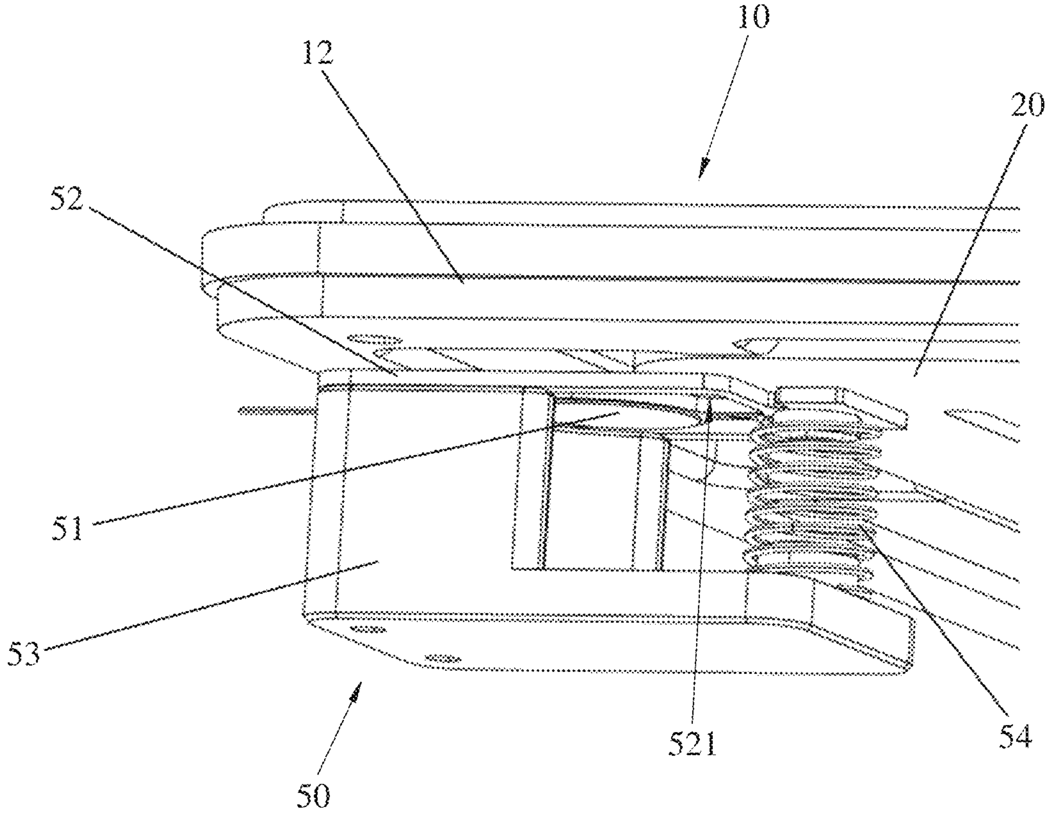
FIG. 6 is a partially enlarged perspective view of the base and the vibration detector in FIG. 5.
Figure 7:
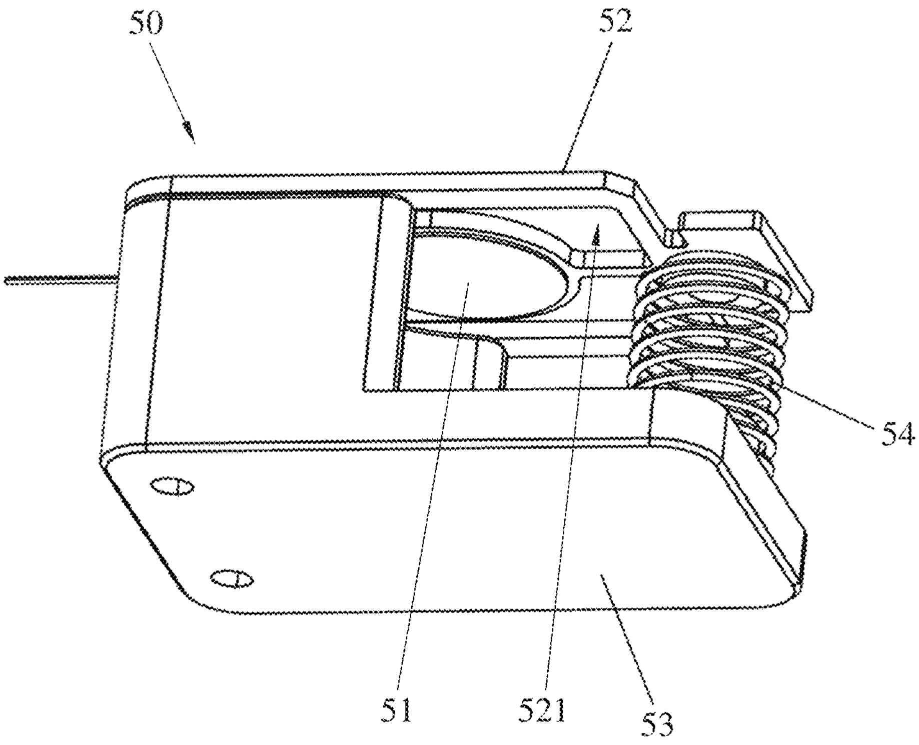
FIG. 7 is a perspective view of the vibration detector in FIG. 6.
Figure 8:
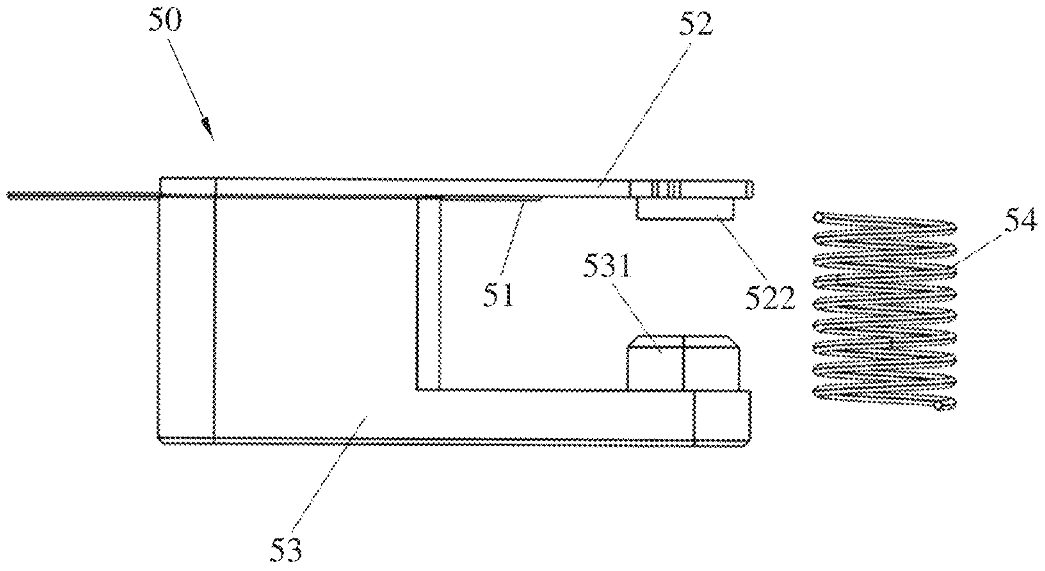
FIG. 8 is an exploded view of the vibration detector in FIG. 7.

Then, referring to FIGS. 5 to 8, FIG. 5 is a perspective view of a covering portion of a base and a vibration detector in FIG. 1, FIG. 6 is a partially enlarged perspective view of the base and the vibration detector in FIG. 5, FIG. 7 is a perspective view of the vibration detector in FIG. 6, and FIG. 8 is an exploded view of the vibration detector in FIG. 7.

The vibration detector 50 is disposed in the base 10 and is positioned on the cover portion 12 of the base 10. The vibration detector 50 includes a piezoelectric ceramic sheet 51 and a vibration transmission plate 52. The piezoelectric ceramic sheet 51 is disposed on the vibration transmission plate 52, and the vibration transmission plate 52 contacts the display panel 20.

Note that the piezoelectric ceramic sheet 51 is made of two copper round electrodes and a piezoelectric ceramic material (e.g., a lead zirconate titanate piezoelectric ceramics). Specifically, the piezoelectric ceramic material is disposed between the two copper round electrodes. Taking advantage of the reversibility of the piezoelectric effect, when the piezoelectric ceramic material encounters a mechanical vibration (or a pressure), a certain amount of charge is generated on the two electrodes, so that a voltage signal can be output from the electrodes, thus realizing vibration detection.

In this embodiment, when the vibration detector 50 is provided in the light-curing 3D printer 1, the vibration transmission plate 52 can transmit vibrations to the piezoelectric ceramic sheet 51 during the printing process, such that whether the print process is performed normally can be determined according to the vibration detection result of the piezoelectric ceramic sheet 51. Compared to a conventional pressure sensor for measuring pressure, the vibration detector 50 is for detecting vibration. Therefore, the vibration detector 50 is not easily to be interfered by outside factors, thereby achieving higher reliability and accuracy.

In this embodiment, the vibration transmission plate 52 is provided with an accommodation hole 521. The piezoelectric ceramic sheet 51 is disposed in the accommodation hole 521. Note that the vibration transmission plate 52 is mainly to transmit the vibrations. Since the vibration transmission plate 52 is provided, the piezoelectric ceramic sheet 51 can be fixed in and does not directly contact the light-curing 3D printer 1, thereby reducing the influence of the vibrations to the piezoelectric ceramic sheet 51. In order to fix the piezoelectric ceramic sheet 51 to the vibration transmission plate 52, the vibration transmission plate 52 can be provided with the accommodation hole 521 for accommodating the piezoelectric ceramic sheet 51.

In this embodiment, the vibration detector 50 further includes a seat 53. The vibration transmission plate 52 is disposed on the seat 53, and the piezoelectric ceramic sheet 51 is located in the seat 53. Note that since the seat 53 is provided, the piezoelectric ceramic sheet 51 can be accommodated in the seat 53, which prevents the piezoelectric ceramic sheet 51 from contacting outside environment, thereby reducing the risk of damage.

In this embodiment, the vibration detector 50 further includes a spring 54. The spring 54 is disposed between the seat 53 and the vibration transmission plate 52, and the spring 54 contacts the seat 53 and the vibration transmission plate 52.

Note that the vibration transmission plate 52 is generally a metal plate. The metal plate is cheap, thereby reducing the material cost of the product. However, the metal plate has a poor structural strength and thus may be easily deformed when a force is applied thereon, which does not facilitate the vibration detection. Therefore, in this embodiment, the spring 54 is provided between the seat 53 and the vibration transmission plate 52, and the spring 54 can help the vibration transmission plate 52 to recover its original shape after the vibration transmission plate 52 is deformed, thereby preventing the vibration transmission plate 52 from being damaged.

In this embodiment, the seat 53 is provided with a first positioning pillar 531, and the vibration transmission plate 52 is provided with a second positioning pillar 522. One end of the spring 54 is sleeved and fixed on the first positioning pillar 531, and another end of the spring 54 is sleeved and fixed on the second positioning pillar 522. Note that two opposite ends of the spring 54 are respectively sleeved and fixed on the first positioning pillar 531 and the second positioning pillar 522. Since the first positioning pillar 531 and the second positioning pillar 522 can effectively position the spring 54, such that the spring 54 is uneasily detached from the seat 53 and the vibration transmission plate 52, thereby improving the reliability.

In this embodiment, the vibration detector 50 includes the vibration transmission plate 52 and the piezoelectric ceramic sheet 51 disposed on the vibration transmission plate 52. When the vibration detector 50 is provided in the light-curing 3D printer 1, the vibration transmission plate 52 can transmit the vibrations to the piezoelectric ceramic sheet 51 during the printing process, such that whether the print process is performed normally can be determined according to the vibration detection result of the piezoelectric ceramic sheet 51, which is not easily interfered by outside factors, improves the reliability and the accuracy, has a simple configuration, reduces the cost, and is applicable.

Figure 9:
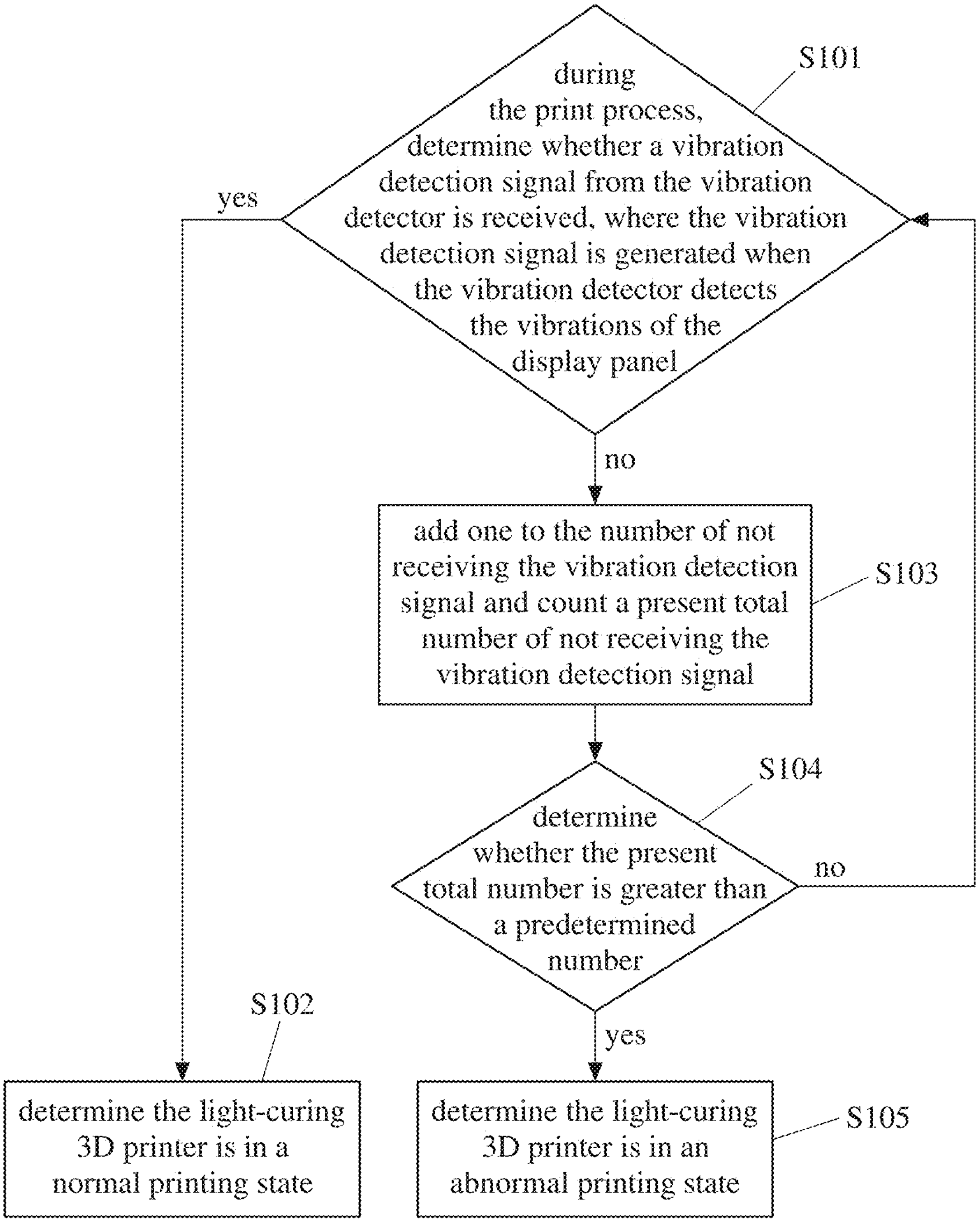
FIG. 9 is a flow chart of a printing control method cooperated with the light-curing 3D printer in FIG. 1.
Figure 10:
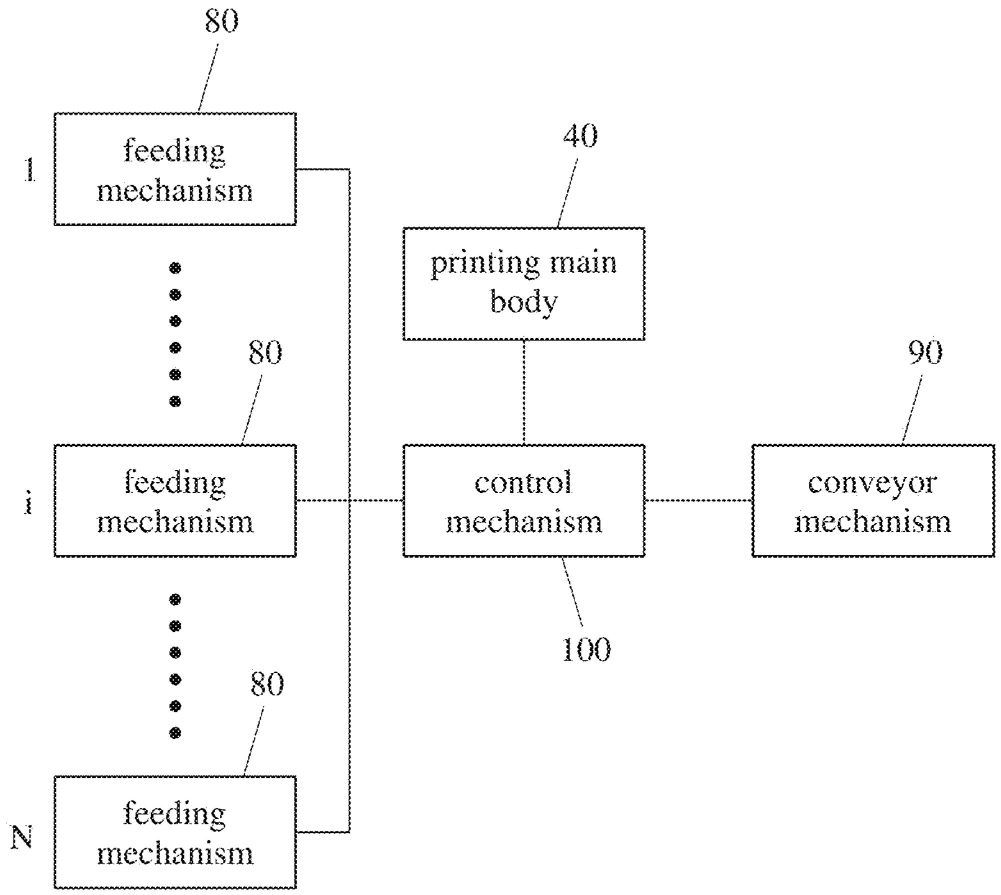
FIG. 10 is a block diagram of a printing main body, feeding mechanisms, a conveyor mechanism and a control mechanism of the light-curing 3D printer in FIG. 1.

Then, referring to FIG. 9, FIG. 9 is a flow chart of a printing control method cooperated with the light-curing 3D printer in FIG. 1. The method specifically includes the following steps:

The step S101 is performed to, during the print process, determine whether a vibration detection signal from the vibration detector 50 is received. The vibration detection signal is generated when the vibration detector 50 detects the vibrations of the display panel 20. If the vibration detection signal is received, the step S102 is performed, or the step S103 is performed.

The step S102 is performed to determine the light-curing 3D printer 1 is in a normal printing state.

Note that when the printing main body 40 presses against and leaves from the display panel 20, the vibrations of the display panel 20 may be formed by the printing main body 40. Therefore, when the vibration detector 50 detects the vibrations of the display panel 20, the light-curing 3D printer 1 can be determined to be in the normal printing state.

The step S103 is performed to add one to the number of not receiving the vibration detection signal and count a present total number of not receiving the vibration detection signal.

In order to reduce the chance to misjudge the light-curing 3D printer 1 is not in the normal printing state, the light-curing 3D printer 1 will not be determined to not be in the normal printing state by one time of not receiving the vibration detection signal. In other words, the number of not receiving the vibration detection signal will be counted, and whether there are multiple times of not receiving vibration detection signals happens. If yes, the light-curing 3D printer 1 is determined to not be in the normal printing state. Otherwise, it can be treated as misjudge.

The step S104 is performed to determine whether the present total number is greater than a predetermined number. If yes, the step S105 is performed. If no, the step S101 is performed again.

Note that the aforementioned predetermined number is set according to the experience of a technician from simulations or experiments. The predetermined number may be a random number, such as 10; that is when the present total number of not receiving the vibration detection signal is greater than 10, the light-curing 3D printer 1 is determined to be in an abnormal printing state.

The step S105 is performed to determine the light-curing 3D printer 1 is in the abnormal printing state. Note that when the light-curing 3D printer 1 is determined to be in the abnormal printing state, the light-curing 3D printer 1 stops printing for preventing further wasting the printing material.

In this embodiment, before the step S101, the method may further include the processes of auto leveling and foreign object detection, such as following steps:

During the process of the auto leveling, whether the vibration detection signal from the vibration detector 50 is received is determined. If, yes, a distance between the printing main body 40 and the display panel 20 is determined and denoted as a printing distance during the printing process according to a height of the printing main body 40. If no, an abnormal warning is performed.

During the process of the foreign object detection, whether the vibration detection signal from the vibration detector 50 is received is determined. If no, the step of the abnormal warning is performed. If yes, according to the present height of the printing main body 40, the present distance between the printing main body 40 and the display panel 20 is determined, and whether the present distance is greater than the printing distance is determined. If yes, a foreign object is determined to be located between the printing main body 40 and the display panel 20, and then the step of the abnormal warning is performed. If no, it is determined that there is no foreign object located between the printing main body 40 and the display panel 20, and thus the light-curing 3D printer 1 can perform printing.

Generally, during the process of the foreign object detection, in the case that there is no foreign object located between the printing main body 40 and the display panel 20, when the vibration detector 50 detects the vibrations, the distance between the printing main body 40 and the display panel 20 should be equal to the printing distance. However, in the case that there is a foreign object located between the printing main body 40 and the display panel 20, the printing main body 40 will contact the foreign object before going down to a predetermined height, and thus causes the vibrations, such that the vibration detector 50 detects the vibrations. At this moment, by comparing the present distance between the printing main body 40 and the display panel 20 with the printing distance, it can be determined that there is the foreign object.

Figure 11:
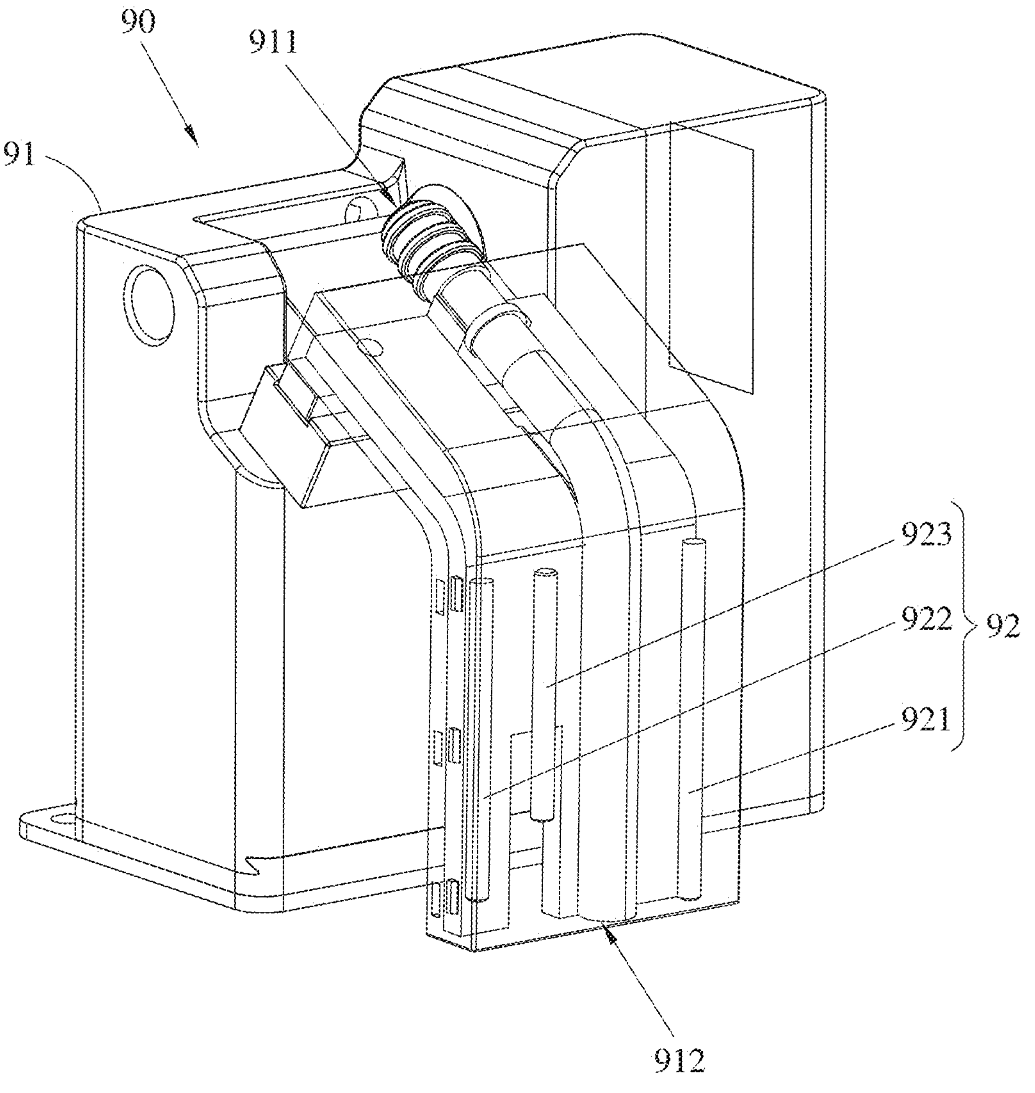
FIG. 11 is a perspective view of the conveyor mechanism in FIG. 1.
Figure 12:
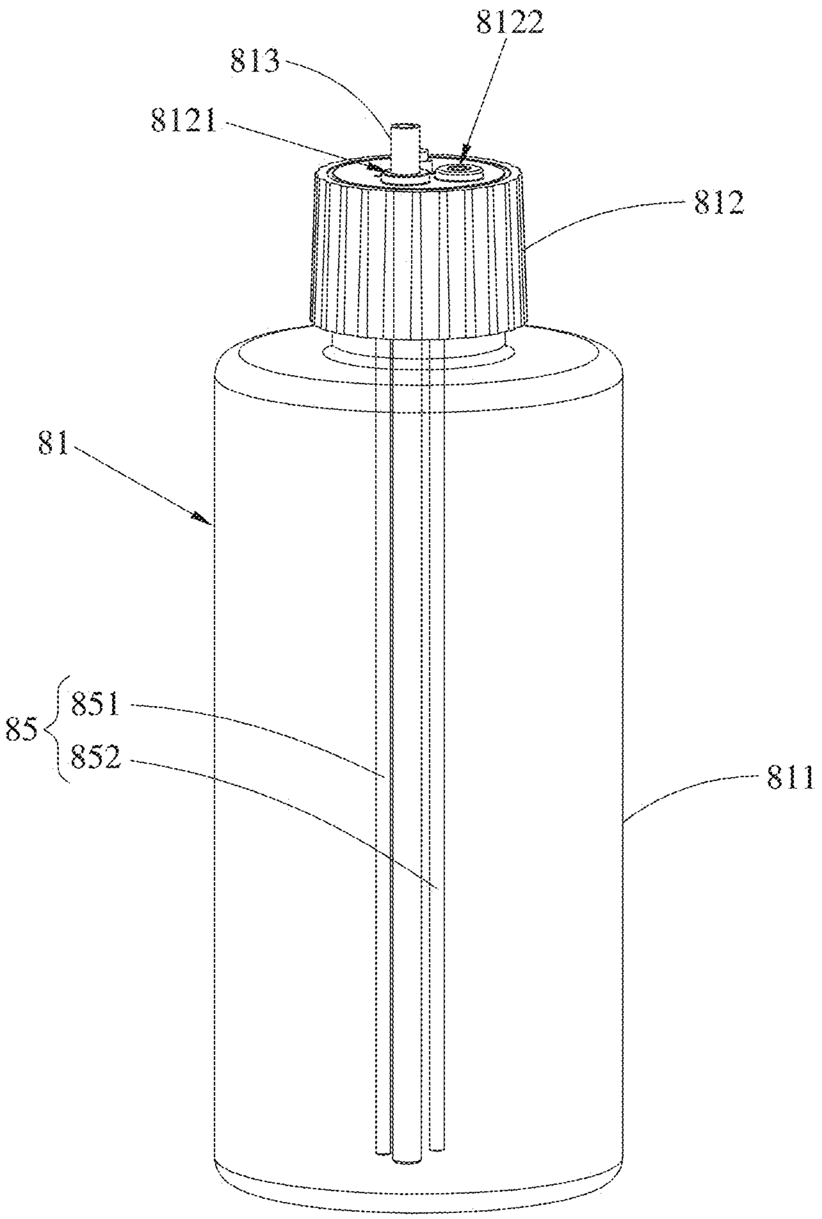
FIG. 12 is a perspective view of a bottle of the feeding mechanism of the light-curing 3D printer in FIG. 1.

Then, referring to FIGS. 1 and 10 to 12, FIG. 10 is a block diagram of a printing main body, feeding mechanisms, a conveyor mechanism and a control mechanism of the light-curing 3D printer in FIG. 1, FIG. 11 is a perspective view of the conveyor mechanism in FIG. 1, and FIG. 12 is a perspective view of a bottle of the feeding mechanism of the light-curing 3D printer in FIG. 1.

In this embodiment, the light-curing 3D printer 1 may further include a feeding mechanism 80, a conveyor mechanism 90 and a control mechanism 100.

The feeding mechanism 80 includes a bottle 81, a pump assembly 82, a first communication pipe 83 and a second communication pipe 84. The bottle 81 is configured to store the printing material, an input end 821 of the pump assembly 82 is connected to the bottle 81 via the first communication pipe 83. It can be understood that before the printing process starts, the printing material is generally not filled into the tank 30. When the printing process starts, the feeding mechanism 80 transfers the printing material in the bottle 81 into the tank 30, such that the printing main body 40 can perform 3D printing with the printing material in the tank 30. In other embodiments, the printing material may be filled into the tank 30 before the printing process starts, thereby accelerating the printing process.

The conveyor mechanism 90 includes a conveying main body 91 and a first detecting assembly 92. The conveying main body 91 is provided with an inlet 911 and an outlet 912. The inlet 911 is connected to an output end 822 of the pump assembly 82 via the second communication pipe 84. The first detecting assembly 92 is configured to detect a liquid level of the printing material in the tank 30. The outlet 912 is connected to the tank 30. Specifically, the outlet 912 of this embodiment directly aims at the tank 30, such that the printing material can directly flow into the tank 30 from the outlet 912. Alternatively, the outlet 912 may be connected to the tank 30 via a pipe, which will not be further introduced.

The control mechanism 100 is electrically connected to the printing main body 40, the feeding mechanism 80 and the conveyor mechanism 90. The control mechanism 100 is configured to drive the pump assembly 82 to extract the printing material in the bottle 81 into the tank 30 according to the liquid level of the printing material in the tank 30 when the printing main body 40 is in a printing state. In addition, the control mechanism 100 is configured to drive the pump assembly 82 to extract the printing material in the tank 30 into the bottle 81 according to the liquid level of the printing material in the tank 30 after the printing main body 40 ends the printing state. The control mechanism 100 may be referred to an apparatus, such as a host, a computer or a remote terminal.

Preferably, the light-curing 3D printer 1 may be provided with a plurality of feeding mechanisms 80, and the conveying main body 91 may be provided with a plurality of inlets 911. Each of the inlets 911 is connected to the output end 822 of the corresponding pump assembly 82 via the second communication pipe 84. If there are N feeding mechanisms 80, the light-curing 3D printer 1 has N bottles 81. In some other embodiments, each of the feeding mechanisms 80 may include a plurality of bottles 81, and the bottles 81 of each of the feeding mechanisms 80 can be considered as one body.

Preferably, during the printing state of the printing main body 40, the control mechanism 100 drives the pump assemblies 82 to extract the printing material in the bottles 81 of the feeding mechanisms 80 one by one into the tank 30 according to the liquid level of the printing material in the tank 30 until the liquid level of the printing material in the tank 30 reaches a tank highest liquid level.

Specifically, the feeding mechanisms 80 are respectively provided with equipment numbers which have an order according to an arrangement order of the feeding mechanisms 80. The control mechanism 100 drives the pump assemblies 82 to extract the printing material in the bottles 81 of the feeding mechanisms 80 into the tank 30 one by one in an increasing order of the equipment numbers of the feeding mechanisms 80 according to the liquid level of the printing material in the tank 30 until the liquid level of the printing material in the tank 30 reaches the tank highest liquid level.

It can be understood that the N feeding mechanisms 80 are provided with equipment numbers, such as "1, 2, . . . and N", according to the arrangement order of the feeding mechanisms 80. At this moment, according to the increasing order of the equipment numbers of the feeding mechanisms 80, the printing material in the bottles 81 of the feeding mechanisms 80 is extracted into the tank 30 one by one; that is, the pump assembly 82 of the feeding mechanism 80 having the equipment number as "1" is firstly driven to operate so as to extract the printing material in the bottle 81 of this feeding mechanism 80 into the tank 30. When the bottle 81 of the feeding mechanism 80 having the equipment number as "1" is empty, the pump assembly 82 of this feeding mechanism 80 stops operating. At this moment, when the liquid level of the printing material in the tank 30 does not reach the tank highest liquid level, the pump assembly 82 of the feeding mechanism 80 having the equipment number as "2" is driven to operate so as to extract the printing material in the bottle 81 of this feeding mechanism 80 into the tank 30. The aforementioned processes are sequentially performed according to the increasing order of the equipment numbers of the feeding mechanisms 80 until the liquid level of the printing material in the tank 30 reaches the tank highest liquid level.

Preferably, after the printing main body 40 ends the printing state, the control mechanism 100 drives the pump assemblies 82 to extract the printing material in the tank 30 into the bottles 81 of the feeding mechanisms 80 one by one according to the liquid level of the printing material in the tank 30 until the liquid level of the printing material in the tank reaches a tank lowest liquid level.

Specifically, the feeding mechanisms 80 are respectively provided with equipment numbers which have an order according to an arrangement order of the feeding mechanism 80. The control mechanism 100 drives the pump assemblies 82 to extract the printing material in the tank 30 into the bottles 81 of the feeding mechanisms 80 one by one in a decreasing order of the equipment numbers of the feeding mechanisms 80 according to the liquid level of the printing material in the tank 30 until the liquid level of the printing material in the tank 30 reaches the tank lowest liquid level.

It can be understood that, according to the decreasing order of the equipment numbers of the feeding mechanisms 80, the printing material in the tank 30 is extracted into the bottles 81 of the feeding mechanisms 80, which represents that the pump assembly 82 of one of the feeding mechanisms 80 with the greatest equipment number, whose bottles 81 are not full, is firstly driven to operate so as to extract the printing material in tank 30 into the bottle 81 of that feeding mechanism 80. When the bottle 81 of that feeding mechanism 80 is full, the pump assembly 82 of that feeding mechanism 80 stops operating. At this moment, when the liquid level of the printing material in the tank 30 does not reach the tank lowest liquid level, the pump assembly 82 of another of the feeding mechanisms 80 with second greatest equipment number, whose bottles 81 are not full, is driven to operate so as to extract the printing material in the tank 30 into the bottle 81 of this feeding mechanism 80. The aforementioned processes are sequentially performed according to the decreasing order of the equipment numbers of the feeding mechanisms 80 until the liquid level of the printing material in the tank 30 reaches the tank lowest liquid level.

Preferably, the first detecting assembly 92 includes a first liquid level detector 921, a second liquid level detector 922 and a third liquid level detector 923. The first liquid level detector 921, the second liquid level detector 922 and the third liquid level detector 923 stick into the tank 30. The first liquid level detector 921 is configured to detect whether the liquid level of the printing material in the tank 30 reaches the tank lowest liquid level. The second liquid level detector 922 is configured to detect whether the liquid level of the printing material in the tank 30 reaches a tank middle liquid level. The third liquid level detector 923 is configured to detect whether the liquid level of the printing material in the tank 30 reaches the tank highest liquid level.

Specifically, during the printing state of the printing main body 40, when the liquid level of the printing material in the tank 30 reaches the tank middle liquid level, the control mechanism 100 drives the pump assembly 82 to extract the printing material in the bottle 81 of the feeding mechanism 80 into the tank 30. When the liquid level of the printing material in the tank 30 reaches the tank highest liquid level, the control mechanism 100 stops the pump assembly 82.

Preferably, the feeding mechanism 80 further includes a second detecting assembly 85. The second detecting assembly 85 includes a fourth liquid level detector 851 and a fifth liquid level detector 852. The fourth liquid level detector 851 and the fifth liquid level detector 852 stick into the bottle 81. The fourth liquid level detector 851 is configured to detect whether the liquid level of the printing material in the bottle 81 reaches a bottle lowest liquid level. The fifth liquid level detector 852 is configured to detect whether the liquid level of the printing material in the bottle 81 reaches a bottle highest liquid level.

Preferably, the bottle 81 includes a body portion 811, a cap portion 812 and a discharging pipe 813. The cap portion 812 is disposed at an opening of the body portion 811. The cap portion 812 is provided with the through hole 8121 and the vent hole 8122. The discharging pipe 813 is a hollow structure with two openings at two opposite ends thereof. The discharging pipe 813 is disposed through the through hole 8121, seals the through hole 8121 and extends into the body portion 811, and one end of the discharging pipe 813 located outside the body portion 811 is connected to the input end 821 of the pump assembly 82 via the first communication pipe 83.

In this embodiment, the first detecting assembly 92 is configured to detect the liquid level of the printing material in the tank 30. The control mechanism 100 is configured to drive the pump assembly 82 to extract the printing material in the bottle 81 into the tank 30 according to the liquid level of the printing material in the tank 30 when the printing main body 40 is the printing state. The control mechanism 100 is configured to drive the pump assembly 82 to extract the printing material in the tank 30 into the bottle 81 according to the liquid level of the printing material in the tank 30 after the printing main body 40 ends the printing state. By continuously detecting the liquid level of the printing material in the tank 30 for controlling the pump assembly 82, the replenishment and the extraction of the printing material in the tank 30 can be achieved in an automated control manner. As a result, the efficiencies of the replenishment and the extraction of the printing material can be improved, and the printing defect and failure caused by manually replenishing and extracting the printing material and the danger caused by splashing the printing material can be prevented.

According to the light-curing 3D printer as disclosed in the above embodiment, when the vibration detector is provided in the light-curing 3D printer, the vibration transmission plate can transmit the vibrations to the piezoelectric ceramic sheet during the printing process, such that whether the print process is performed normally can be determined according to the vibration detection result of the piezoelectric ceramic sheet, which is not easily interfered by outside factors, improves the reliability and the accuracy, has a simple configuration, reduces the cost, and is applicable.

In addition, the guiding mechanism includes the screw rod, the adjustment assembly and the guide rail. The screw rod is connected to the ball nut via screw threads, the adjustment assembly is flexibly connected to the ball nut and the arm, and the arm is slidably connected to the guide rail. When the screw rod and the guide rail are non-parallel to each other, a lateral force may be produced between the screw rod and the guide rail, and the adjustment assembly may be deformed by the lateral force so as to keep the ball nut being moved on the screw rod. As a result, the arm of the printing main body can be smoothly and stably moved along the guide rail, which solves the issue of the conventional case that once the screw rod and the guide are non-parallel to each other, the movement of the arm may be unsmooth, which may cause a printed model has a laminar texture, or cause the arm to be stuck, thereby failing 3D printing process.

Moreover, the first detecting assembly is configured to detect the liquid level of the printing material in the tank. According to the liquid level, the control mechanism may drive the pump assembly to extract the printing material from the bottle into the tank when the printing main body is the printing state, and from the tank into the bottle after the printing state ends. By continuously detecting the liquid level for controlling the pump assembly, the replenishment and the extraction of the printing material in the tank can be achieved in an automated control manner. As a result, the efficiencies of the replenishment and the extraction of the printing material can be improved, and the printing defect and failure caused by manually replenishing and extracting the printing material and the danger caused by splashing the printing material can be prevented.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A light-curing 3D printer, comprising:

a base;

a display panel, disposed on the base;

a tank, disposed on the base and corresponding to the display panel, wherein the tank is configured to store a printing material;

a printing main body, corresponding to the tank and the display panel and configured to perform 3D printing with the printing material in the tank; and a vibration detector, disposed in the base and comprising a piezoelectric ceramic sheet and a vibration transmission plate, wherein the piezoelectric ceramic sheet is disposed on the vibration transmission plate, and the vibration transmission plate is in contact with the display panel;

wherein the vibration detector further comprises a seat, the seat is disposed in the base, the vibration transmission plate is disposed on the seat, and the piezoelectric ceramic sheet is located in the seat;

wherein the vibration detector further comprises a spring, the spring is disposed between and in contact with the seat and the vibration transmission plate;

wherein the seat is provided with a first positioning pillar, the vibration transmission plate is provided with a second positioning pillar, and two opposite ends of the spring are respectively sleeved on the first positioning pillar and the second positioning pillar.

2. The light-curing 3D printer according to claim 1, wherein the vibration transmission plate is provided with an accommodation hole, and the piezoelectric ceramic sheet is disposed in the accommodation hole.

3. The light-curing 3D printer according to claim 1, further comprising at least one feeding mechanism configured to feed the printing material into the tank, a conveyor mechanism and a control mechanism, wherein the at least one feeding mechanism comprises a bottle, a pump assembly, a first communication pipe and a second communication pipe, the bottle stores the printing material, an input end of the pump assembly is connected to the bottle via the first communication pipe, the conveyor mechanism comprises a conveying main body and a first detecting assembly, the conveying main body is provided with at least one inlet and an outlet, the at least one inlet is connected to an output end of the pump assembly via the second communication pipe, the first detecting assembly is configured to detect a liquid level of the printing material in the tank, the outlet communicates with the tank, the control mechanism is electrically connected to the printing main body, the at least one feeding mechanism and the conveyor mechanism, the control mechanism is configured to drive the pump assembly to extract the printing material in the bottle into the tank according to the liquid level of the printing material in the tank when the printing main body is in a printing state, and the control mechanism is configured to drive the pump assembly to extract the printing material in the tank into the bottle according to the liquid level of the printing material in the tank after the printing main body ends the printing state.

4. The light-curing 3D printer according to claim 3, wherein the at least one feeding mechanism comprises a plurality of feeding mechanisms, the at least one inlet of the conveying main body comprises a plurality of inlets, the plurality of inlets are respectively connected to the output ends of the pump assemblies via the second communication pipes.

5. The light-curing 3D printer according to claim 4, wherein when the printing main body is in the printing state, the control mechanism drives the pump assemblies to extract the printing material in the bottles of the plurality of feeding mechanisms one by one into the tank according to the liquid level of the printing material in the tank until the liquid level of the printing material in the tank reaches a tank highest liquid level.

6. The light-curing 3D printer according to claim 5, wherein the plurality of feeding mechanisms are respectively provided with equipment numbers which have an order according to an arrangement order of the plurality of feeding mechanisms, the control mechanism drives the pump assemblies to extract the printing material in the bottles of the plurality of feeding mechanisms into the tank one by one in an increasing order of the equipment numbers of the plurality of feeding mechanisms according to the liquid level of the printing material in the tank.

7. The light-curing 3D printer according to claim 4, wherein after the printing main body ends the printing state, the control mechanism drives the pump assemblies to extract the printing material in the tank into the bottles of the plurality of feeding mechanisms one by one according to the liquid level of the printing material in the tank until the liquid level of the printing material in the tank reaches a tank lowest liquid level.

8. The light-curing 3D printer according to claim 7, wherein the plurality of feeding mechanisms are respectively provided with equipment numbers which have an order according to an arrangement order of the plurality of feeding mechanisms, the control mechanism drives the pump assemblies to extract the printing material in the tank into the bottles of the plurality of feeding mechanisms one by one in a decreasing order of the equipment numbers of the plurality of feeding mechanisms according to the liquid level of the printing material in the tank.

9. The light-curing 3D printer according to claim 3, wherein the first detecting assembly comprises a first liquid level detector, a second liquid level detector and a third liquid level detector, the first liquid level detector, the second liquid level detector and the third liquid level detector stick into the tank for detecting whether the liquid level of the printing material in the tank reaches a tank highest liquid level, a tank middle liquid level, and a tank lowest liquid level.

10. The light-curing 3D printer according to claim 9, wherein during the printing state of the printing main body, when the liquid level of the printing material in the tank reaches the tank middle liquid level, the control mechanism drives the pump assembly to extract the printing material in the bottle into the tank; when the liquid level of the printing material in the tank reaches the tank highest liquid level, the control mechanism stops the pump assembly.

11. The light-curing 3D printer according to claim 9, wherein the at least one feeding mechanism further comprises a second detecting assembly, the second detecting assembly comprises a fourth liquid level detector and a fifth liquid level detector for detecting whether a liquid level of the printing material in the bottle reaches a bottle lowest liquid level and a bottle highest liquid level.

12. The light-curing 3D printer according to claim 3, wherein the bottle comprises a body portion, a cap portion and a discharging pipe, the cap portion is disposed at an opening of the body portion, the cap portion is provided with a through hole and a vent hole, the discharging pipe is a hollow structure with two openings at two opposite ends thereof, the discharging pipe is disposed through the through hole, seals the through hole and extends into the body portion, and one end of the discharging pipe located outside the body portion is connected to the input end of the pump assembly via the first communication pipe.

13. The light-curing 3D printer according to claim 1, further comprising a guiding mechanism and an adjustment assembly, wherein the guiding mechanism comprises a screw rod and a guide rail, the screw rod is disposed on the base and is connected to a ball nut via screw threads, the ball nut and the guide rail are connected to an arm of the printing main body; when the screw rod is driven, the ball nut moves the arm along the guide rail; the adjustment assembly is flexibly connected to the arm and the ball nut for eliminating a lateral force produced when the screw rod and the guide rail are non-parallel to each other.

14. The light-curing 3D printer according to claim 13, wherein the adjustment assembly comprises a first metal sheet, a flexible component and a second metal sheet, the first metal sheet is connected to the second metal sheet via the flexible component, the first metal sheet is connected to the screw rod via screw threads, and the second metal sheet is connected to the arm via screw threads.

15. The light-curing 3D printer according to claim 13, wherein the guiding mechanism comprises a stand, the stand is provided with a step portion, a first side surface of the step portion is disposed vertically, and the guide rail is in contact with the first side surface and removably connected to the stand.

16. The light-curing 3D printer according to claim 13, wherein the guiding mechanism further comprises a slidable component, and the slidable component is disposed on the guide rail and connected to the arm.

17. The light-curing 3D printer according to claim 13, wherein the guiding mechanism further comprises a driving component, and the driving component is connected to the screw rod for rotating the screw rod.

* * * * *